United States Patent [19]

Oda et al.

[11] Patent Number: 4,739,394
[45] Date of Patent: Apr. 19, 1988

[54] WHITE BALANCED ELECTRONIC STILL CAMERA

[75] Inventors: Kazuya Oda; Izumi Miyake; Kiyotaka Kaneko, all of Tokyo, Japan

[73] Assignee: Fuji Photo Film Co., Ltd., Kanagawa, Japan

[21] Appl. No.: 886,453

[22] Filed: Jul. 17, 1986

[30] Foreign Application Priority Data

Jul. 17, 1985 [JP] Japan .................. 60-156024

[51] Int. Cl.⁴ .................. H04N 9/535
[52] U.S. Cl. .................. 358/29; 358/909
[58] Field of Search .................. 358/29, 909

[56] References Cited

U.S. PATENT DOCUMENTS 4,489,345 12/1984 Itani et al. .................. 358/29

FOREIGN PATENT DOCUMENTS 0042482 4/1981 Japan .................. 358/29
0155888 9/1982 Japan .................. 358/29
0210089 10/1985 Japan .................. 358/29

Primary Examiner—James J. Groody
Assistant Examiner—David E. Harvey
Attorney, Agent, or Firm—Sughrue, Mion, Zinn, Macpeak and Seas

[57] ABSTRACT

An apparatus for automatically providing white balance in an electronic still camera. When the camera is not in use a sliding cover is placed over the lens with a white translucent sheet facing the lens. At the beginning of use, the sliding of the lens cover to uncover the lens triggers a white balancing circuit to perform the required white balancing for the ambient light admitted through the white translucent sheet.

4 Claims, 1 Drawing Sheet

WHITE BALANCED ELECTRONIC STILL CAMERA

BACKGROUND OF THE INVENTION

1. Field of the Invention

This invention relates to an electronic still camera for electrically recording an image of an object on a magnetic recording medium. More particularly, the invention relates to an electronic still camera in which an automatic white balance adjustment is carried out by sliding the lens cover which is integrally mounted on the camera body in such a manner that it can be freely opened and closed.

2. Background Art

Recently, an electronic still camera has been developed in which a solid image pickup element, such as a CCD, is combined with a small flexible magnetic disk or semiconductor memory, in order to record a still picture on the magnetic disk or semiconductor memory.

It is essential that, before an object is photographed with such an electronic still camera or video camera, a so-called "white balance adjustment" is carried out so that a white object is reproduced with true white color regardless of the spectrum of the light illuminating the photographic site.

Heretofore, for a silver halide film camera, during a printing operation at a developing laboratory the white balance adjustment is controlled, for instance, by controlling the red, green and blue exposure periods with yellow, magenta and cyan cut filters. Therefore, the photographer can photograph a scene without paying attention to the white balance adjustment.

However, in the case of an electronic still camera for recording still pictures directly on the magnetic recording medium, it is impossible to subsequently perform the intermediate correction of the white balance as described above. Therefore, the white balance adjustment is carried out at the time of recording or reproducing of still pictures. Generally, the camera is provided with a white balance adjusting mechanism so that the photographer can perform the white balance adjustment just before the still pictures are recorded.

For instance, in one example of a conventional white balance adjusting mechanism, a white object, such as a white sheet, is photographed in such a manner that its image covers the entire screen, or the mechanism is operated with white lens cap mounted on the lens.

In the case of a still camera, the photographer with the camera often moves to many places to photograph various objects. In this case, the photographer must perform the above-described white balance adjustment whenever he moves to a new place. However, if the white balance adjusting method using the lens can separately provided on the camera body is employed for the camera, the photographer is liable to forget to mount the lens cap on the lens although it should be attached to the lens whenever the photographic site is changed. That is, the photographing operation is liable to be performed under different photographic conditions with the lens cap disconnected from the lens. In this case, the photographing operation is carried out with the camera set for unsuitable photographic conditions. As a result, the recorded picture has unnatural color.

SUMMARY OF THE INVENTION

An object of this invention is to eliminate the above described difficulties.

More specifically, an object of the invention is to provide an electronic still camera which, similarly as in the case of a silver halide film camera, can perform photographing operations being free from the troublesome manual white balance adjustment.

The foregoing object of the invention has been achieved by an electronic still camera which electrically records a still picture of an object which is photographed by an image pickup system. According to the invention, the camera includes a lens cover which is translucent white at least in part and which confronts the camera lens. The lens cover can take at least two positions, a lens opening position and a lens closing position and is integrally mounted on the camera body. A power switch is turned on in association with the initial lens opening operation of the lens cover. White balance is achieved according to an image pickup signal resultant from the light detected through the translucent white part of the lens cover by the image pickup system. The image pickup system is activated when the power switch is turned on.

DETAILED DESCRIPTION OF THE PREFERRED EMBODIMENT

One embodiment of this invention will be described with reference to the accompanying drawings. An electronic still camera of this embodiment uses a solid-state image pickup element, such as a CCD (charge-coupled device), for its image pickup system. The output signals of the solid state image pickup element are recorded on a small flexible magnetic disc.

Figure 1:
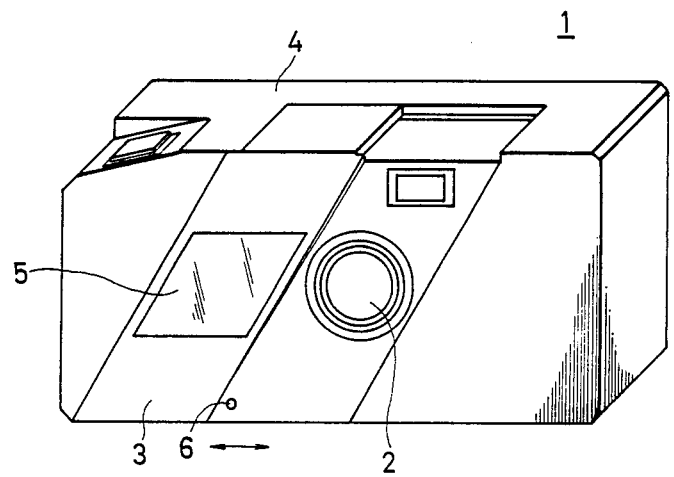
FIG. 1 is an external perspective view of an electronic still camera which is one embodiment of this invention.

The electronic still camera of the invention, as shown in FIG. 1, has substantially the same exterior configuration as a conventional compact-type silver halide film camera, such as that marketed under the Japanese trade name "Karudea" by FUJI Photographic Film Co. In this camera, the lens cap is integral with the camera body.

In an electronic still camera 1, a slidable lens cover 3 selectively protects a lens 2. The lens cover 3 is mounted on a camera body 4 in such a manner that it does not come off the camera body 4 but may be slid horizontally over the lens 2 between two end positions, i.e., a lens opening position (to the left in FIG. 1) and a lens closing position (to the right).

The lens cover 3 has a windows of a light transmitting white-colored sheet which covers at least the lens 2 when the lens cover 3 is slid to the lens closing position. That is, the lens cover 3 has a white, translucent portion.

The camera body 4 has a power switch 6 at its front. When the lens cover 3 is opened, the power switch 6 is immediately operated and turned on by the opening of the lens cover 3.

The power switch 6 is used to drive an image pickup system including a CCD 7 (described later) and a recording system including a magnetic disc 10.

Figure 2:
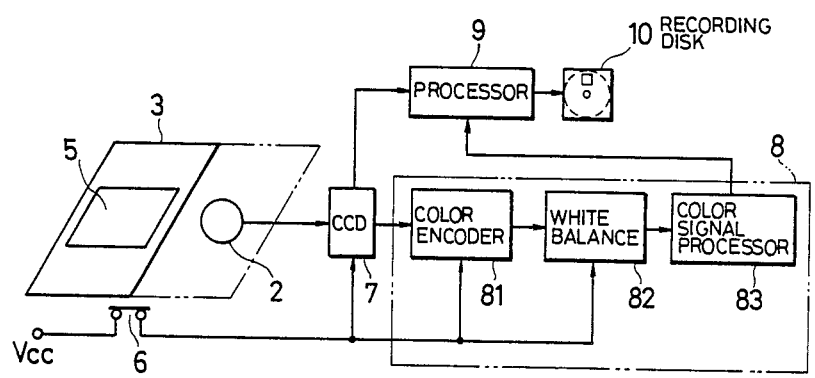
FIG. 2 is a block diagram for a description of the automatic white balance adjusting method applied to the electronic still camera shown in FIG. 1.

Now, a white balance adjusting method for the electronic still camera of the invention will be described with reference to a block diagram shown in FIG. 2.

When the camera is not in use, or it is stored, the lens is covered with the lens cover 3 and the power switch 6 is open. In order to take a picture with the camera, it is necessary to move the lens cover 3 to open the lens 2. When the lens cover 3 is initially moved towards its open position, the power switch 6 is operated to drive a color decision circuit 8. However, it should be noted that, at this time instant, the lens 2 is still covered by the lens cover 3. More particularly, the lens 2 is covered by the window 5 of the lens cover 3. When, under this condition, external light at the photographic site is applied first through the light transmitting white sheet of the window 5 and then through the lens 2 to the CCD 7, the CCD 7 converts the inputted color data (which is a measurement of color temperature of the light source) into an image pickup signal, which is sent to the color decision circuit 8. The color decision circuit 8 is adapted to perform the automatic white balance adjustment, which is well known in the art. The color decision circuit 8 includes, for instance, a color encoder 81 which receives the image pickup signal from the CCD, an automatic white balance circuit 82, and a color signal processing circuit 83. That is, the color data provided by the CCD 7 is subjected to color separation for red, green and blue (R, G and B) components in the color encoder 81, the output of which is applied to the automatic white balance circuit 82. In the automatic white balance circuit 82, the pre-amplification gain is adjusted with the aid of the color signal processing circuit 83 so that, in each signal component subjected to color separation, the red and green components match the blue component.

In general, the camera is so adjusted that, when the pre-amplification gain is set at R:G:B:=1:1:1, a true white object is reproduced white. If the color temperature changes so as to vary the ratio, then the automatic white balance circuit 82 change the pre-amplification gain so that the ratios of the red, green and blue components in the untrue, white light become 1 as described above.

When the lens cover 3 is moved to the fully open position after the automatic white balance adjustment has been accomplished, as described above, the color decision circuit 8 is interrupted and the most current values of pre-amplification gain are used. When the photographer photographs the object under suitable photographic conditions, the image pickup signal of the object is applied through a signal processing circuit 9 to a magnetic disk 10, so that it is recorded on the disk 10. The signal processor 9 contains the pre-amplifiers whose gains are adjusted by the white balance circuit 82 and the color processor 83. Thus, one photographic operation has been accomplished.

If the photographing conditions are maintained unchanged, then the photographer can perform the next photographic operation in the same way. However, if the photographic conditions are changed —for instance the photographing site is changed, it is necessary to close the lens cover 3 so that the white balance adjustment is carried out again when the lens cover 3 is opened at the next photographic site.

In order to eliminate the difficulty that, although the lens cover 3 has not been closed, a photographing operation is carried out under different photographing conditions, the electronic still camera of the invention may be modified as follows. In this case, the camera is provided with a timer circuit, initially actuated when the white balance adjustment is made, which automatically interrupts the power supply when the lens cover 3 is left open after a predetermined period of time has passed, so that the camera is made inoperable.

Furthermore, the camera may be provided with means for providing a warning in the case where a photographing condition is beyond the range of correction by automatic white balance adjustment, for instance the luminance is extremely low.

In the above-described electronic still camera, the automatic white balance adjustment is employed. However, it may be so designed that the image pickup signal from the CCD is stored in a memory circuit, and after the lens cover is fully opened, a control knob is operated while referring to the indicator which is operated by the image pickup signal.

Furthermore, for the white balance adjustment, the image pickup signal from the CCD is utilized to mechanically combine an amber filter with the lens.

As is apparent from the above description, in the electronic still camera of the invention, the automatic white balance adjustment can be achieved merely by sliding the lens cover. Since the lens cover is mounted on the camera body so that it may no come off the camera body, accidental loss of the lens cover is prevented.

What is claimed is:

1. An electronic still camera for electrically recording a picture of an object which is photographed through a lens (2) by an image pickup system, comprising:
   (a) a camera body (4) mounting said lens,
   (b) a lens cover (3) mounted on said camera body and having a translucent white window (5) in a portion thereof confrontable with said lens, said lens cover being movable between lens closed and lens open end positions through an intermediate lens opening position where at least part of said lens is covered by said translucent white window (lens cover being integrally mounted on a camera body);
   (c) a switch (6) which is turned on in response to a movement of said lens cover through said intermediate lens opening position;
   (d) means (8) for achieving white balance among a plurality of color signals generated in accordance with an image pickup signal produced by said image pickup system when said lens cover is at said intermediate lens opening position; and
   (e) means (Vcc) for driving said white balance achieving means when said switch is turned on.

2. An electronic camera as recited in claim 1, wherein said lens cover is slidable along a path transverse to an optical axis of said lens and said switch is disposed along said path.

3. An electronic camera as recited in claim 2, wherein said switch is a power switch.

4. An electronic camera as recited in claim 3, further comprising timing means, triggered by said switch, for interrupting power to said white balancing means after a predetermined period.

* * * * *